United States Patent
Hartman et al.

(10) Patent No.: US 7,324,213 B2
(45) Date of Patent: Jan. 29, 2008

(54) SMALL ANGLE HIGH FREQUENCY ANGULAR DISPLACEMENT MEASUREMENT SYSTEM

(75) Inventors: Ronald D. Hartman, Odessa, FL (US); Douglas A. Chamberlin, Trinity, FL (US); Kim R. Heinicka, Seminole, FL (US); John Koss, Fort Worth, TX (US); Bryan Williams, Novi, MI (US); Brandon Noska, Austin, TX (US)

(73) Assignee: Honeywell International Inc., Morristown, NJ (US)

( * ) Notice: Subject to any disclaimer, the term of this patent is extended or adjusted under 35 U.S.C. 154(b) by 305 days.

(21) Appl. No.: 11/010,055

(22) Filed: Dec. 10, 2004

(65) Prior Publication Data

US 2006/0126075 A1   Jun. 15, 2006

(51) Int. Cl.
*G01B 11/02* (2006.01)
(52) U.S. Cl. ..................................... 356/510
(58) Field of Classification Search ................ 356/496, 356/498, 508, 510
See application file for complete search history.

(56) References Cited

U.S. PATENT DOCUMENTS 6,213,443 B1   4/2001   Wakui

FOREIGN PATENT DOCUMENTS

WO   WO 2004/097433   11/2004

OTHER PUBLICATIONS

Umeda et al, Calibration of a Three-Axis Acclerometer as a Three-Dimensional Accelerometer Using Laser Interferometers and a Three-Di, Calibration of a Three-Axis Accelerometer Using Laser Interferometers and a Three-Dimensional Vibration Generator, Jun. 4, 2003, Publisher: *Journal Of The Japan Society Of Mechanical Engineers*, pp. 67-70, Published in: JP.

*Primary Examiner*—Patrick Connolly
(74) *Attorney, Agent, or Firm*—Fogg & Powers, LLC

(57) ABSTRACT

A system to determine unwanted noise produced by simulation equipment. In one embodiment, an angular rotation noise measuring system comprises a stable body, a laser, at least one interferometer and at least one mirror. The laser is adapted to generate a primary laser beam and is mounted to the stable body. The at least one interferometer is adapted to split the primary laser beam into two or more out of phase secondary laser beams. Moreover, the interferometer is coupled to the stable body. The at least one mirror is coupled to a fixture on a vibration generating device. The fixture is adapted to hold a device under test. Each mirror is adapted to reflect an associated secondary laser beam back to the interferometer such that an interference pattern is formed with the secondary laser beams. Changes to the interference pattern determine the angular rotation noise caused by the vibration generating device.

22 Claims, 3 Drawing Sheets

SMALL ANGLE HIGH FREQUENCY ANGULAR DISPLACEMENT MEASUREMENT SYSTEM

GOVERNMENT LICENSE RIGHTS

The U.S. Government may have certain rights in the present invention as provided for by the terms of Contract No. DASG-60-00-C-0072 awarded by the Department of the Army.

TECHNICAL FIELD

The present invention relates generally to simulation equipment and in particular a way of determining unwanted noise produced by the simulation equipment.

BACKGROUND

Precision equipment used in aviation and other critical industries need to be tested before they are placed in use. Typically, a manufacture of such precision equipment is required to verify that the equipment will work within specific tolerances required by the purchaser. To assess the tolerance of such equipment, the equipment is subjected to test simulation equipment. An example of precision equipment includes an inertial measurement unit (IMU) that is used in guidance systems of ground-to-air missiles. IMUs require verification of performance when subjected to in-flight vibrations. To provide the verification, test equipment such as a shaker table is used to generate random vibrations that simulate the environment the IMU will experience in service. The performance of the IMU (or device under test) is then determined.

A shaker table is designed to move linearly along one axis. However, a problem encountered in testing precision equipment with a shaker table is that shaker table itself introduces an unknown amount of angular displacement error (noise) due to mechanical nature of the shaker table. This angular displacement error causes the true performance of the precision equipment to not be accurately accessed. The ability to measure the angular displacement caused by the shaker table is difficult because it is typically very small such that conventional means are ineffective.

For the reasons stated above and for other reasons stated below which will become apparent to those skilled in the art upon reading and understanding the present specification, there is a need in the art for a method of determining the angular frequency displacement caused by test equipment so it can be factored out of test results of devices tested by the equipment.

SUMMARY

The above-mentioned problems and other problems are resolved by the present invention and will be understood by reading and studying the following specification.

In one embodiment, a method of factoring out the angular rotation of a shaker table along an axis is disclosed. The method comprises determining the angular rotation of the fixture based at least in part on reflecting two or more laser beams with off set phases off of at least one mirror coupled to a fixture on the shaker table and then subtracting the determined angular rotation of the fixture out of test results of a device under test mounted to the fixture.

In another embodiment, a method of determining the angular rotation of along an axis of motion of a fixture in a random vibration testing device is disclosed. The method comprises splitting a primary laser beam into two or more secondary laser beams. Shifting the phase of at least one of the secondary laser beams such that at least one of the secondary laser beams is out of phase in relation to the remaining secondary laser beams. Reflecting each secondary laser beam off of an associated mirror coupled to the fixture. Reading a fringe pattern in an interference pattern created by the reflected secondary laser beams to get a reference fringe pattern. Activating the random vibration testing device. Reading a fringe pattern in an interference pattern created by the reflected secondary laser beams after the activation of the random vibration testing device to get a shifted fringe pattern and comparing the shifted fringe pattern with the reference fringe pattern to determine the angular rotation along an axis of the fixture.

In still another embodiment, an angular rotation noise measuring system is disclosed. The measuring system comprises a stable body, a laser, at least one interferometer and at least one mirror. The laser is adapted to generate a primary laser beam and is mounted to the stable body. The at least one interferometer is adapted to split the primary laser beam into two or more out of phase secondary laser beams. Moreover, the interferometer is coupled to the stable body. The at least one mirror is coupled to a fixture of a vibration generating device. The fixture is adapted to hold a device under test. Each mirror is adapted to reflect an associated secondary laser beam back to the interferometer such that an interference pattern is formed with the secondary laser beams. Changes to the interference pattern determine the angular rotation noise caused by the vibration generating device.

In yet another embodiment, another angular rotation noise measuring system is disclosed. The measuring system includes a laser, a beam splitter, a first and second interferometer, a first and second mirror and a processor. The laser is adapted to generate a primary laser beam. The beam splitter is adapted to split the primary laser beam into first and second split laser beams. The first interferometer is adapted to split the first split laser beam into a plurality of out of phase secondary laser beams. The second interferometer is adapted to split the second split laser beam into a plurality of out of phase secondary laser beams. The first mirror coupled to a fixture of a vibration simulation system. Moreover, the first mirror is adapted to reflect the secondary laser beams from the first interferometer back to the first interferometer along the same path the secondary laser beams took in reaching the first mirror. The second mirror is coupled to the fixture of the vibration simulation system. Moreover, the second mirror is adapted to reflect the secondary laser beams from the second interferometer back to the second interferometer along the same path the secondary laser beams took in reaching the second mirror. A processor is adapted to read the fringe patterns in interference patterns created by the reflected secondary laser beams to determine the angular rotation noise produced by the vibration simulation system.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a method and system of determining angular displacement error of a shaker table so that it can be factored out of test results of a device being tested. For example, angular displacement errors of the shaker table are determined so that they can be factored out of the test results of IMUs. Embodiments of the present invention determine angular displacement error (rotation in a measured axis) in a shaker table by comparing optical interference patterns of laser beams reflected off of one or more mirrors coupled to a fixture of a shaker table.

Figure 1:
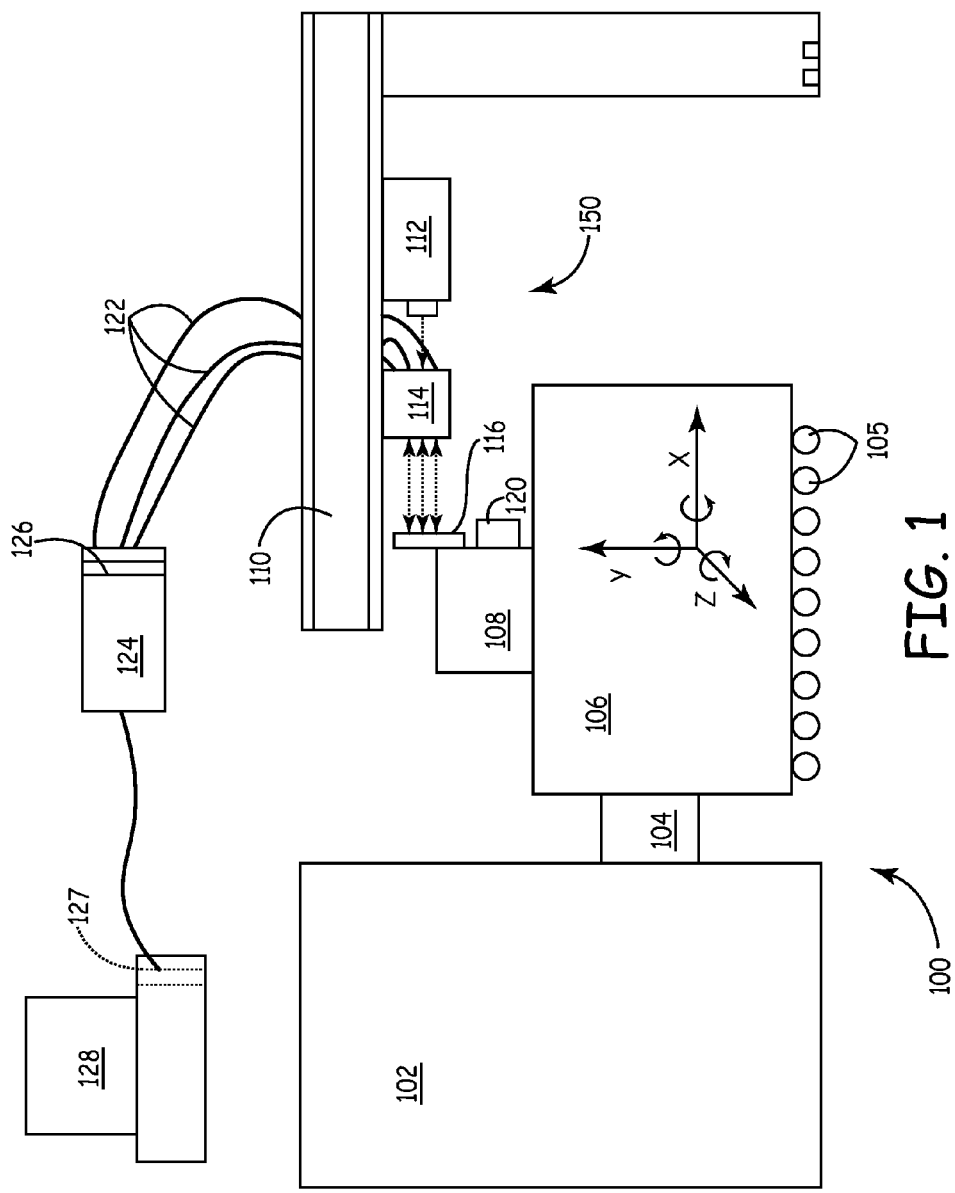
FIG. 1 is side view of a shaker table and angular rotation test equipment of the present invention.

Referring to FIG. 1, one embodiment of the present invention is illustrated. FIG. 1 includes a shaker table 100 and an angular rotation noise measurement system 150. The shaker table 100 includes a vibration generator 102 adapted to produce vibrations in a given direction. Also included is a slip plate 106. The slip plate 106 is coupled to the vibration generator 102 by a vibration head 104. The slip plate 106 movably rests on a plurality of oil bearings 105. A fixture 108 is coupled to the slip plate 106. Devices under test (DUTs) 120 are adapted to be mounted to the fixture 108 to subject them to the vibrations created by the shaker table. Also indicated in FIG. 1 is an illustration of an X, Y and Z axis. The slip plate 106 of FIG. 1, is adapted to move in the X direction when the vibration generator is activated in this example. Also indicated in FIG. 1 is unwanted angular rotations in regards to the X, Y and Z axis's the present invention is adapted to measure.

The angular rotation noise measurement system 150 includes a stable body 110, a laser 112, an interferometer 114, at least one mirror 116, an interface card and a computer 128. In one embodiment, the stable body 110 is constructed of one or more I-beams 110. The stable body 110 is insolated from the shaker table 100 so it is not susceptible to any angular rotations produced by the shaker table 100. In one embodiment, the laser 112 is adapted to produce a laser beam having frequency of approximately 10 to 20 kilohertz. Laser interferometers used in the present invention resolve angles in the μ-radian range. Interferometer 114 is adapted to split the original laser beam into a plurality of secondary laser beams having different phases. In one embodiment, the interferometer 114 is adapted to split the original laser beam into three secondary beams.

Each of the secondary laser beams are reflected back off of the one or more mirrors 116. In particular, each mirror 116 is positioned normally orthogonal to its associated secondary laser beam and has generally a flat surface so that the associated secondary laser beam is reflected back along the path it traveled to the mirror. An interference pattern is formed with the reflected back secondary laser beams that have light and dark fringe patterns. By reading changes in the light and dark fringes the angular motion of the fixture 108 can be determined. An example of an interferometer that can perform the functions required for the present invention is the Zygo 6191-0624-01 by Zygo systems.

In one embodiment, the reflected secondary laser beams are sent through fiber optic cables 122 from the interferometer 114 to a measuring board 126 in a chassis 124. The fiber optic cables 122 are adapted to allow the returned secondary beams to travel in non-linear paths without losing energy. An interference pattern having light and dark fringe patterns is created by the by the reflected secondary laser beams. The measurement board 126 is adapted to measure the light and dark trim patterns. In one embodiment, the values of the intensity of laser beams is measured and these values are use to calculate the length of the beams. Data determined by the measurement board 126 is sent to an interface card 126 in a personal computer (PC) 127. Using simple trigonometry program, the rotation of the mirror 116 and hence the fixture 108 of the shaker table 100 is determined by a processor in the PC 127.

Also illustrated in FIG. 1, is a DUT 120 mounted to the fixture 108. Hence, in this embodiment, the angular rotation of the fixture can be determined at the same time the performance of the DUT 120 is evaluated. That is, in this embodiment, the angular rotation of the fixture 108 can be determined while the DUT 120 is being evaluated, so the actual angular rotation noise the fixture subjected the DUT 120 to, can be subtract from the output of the DUT 120. This provides the user the ability to assess the actual performance of the DUT 120 under the applied simulation.

Figure 2:
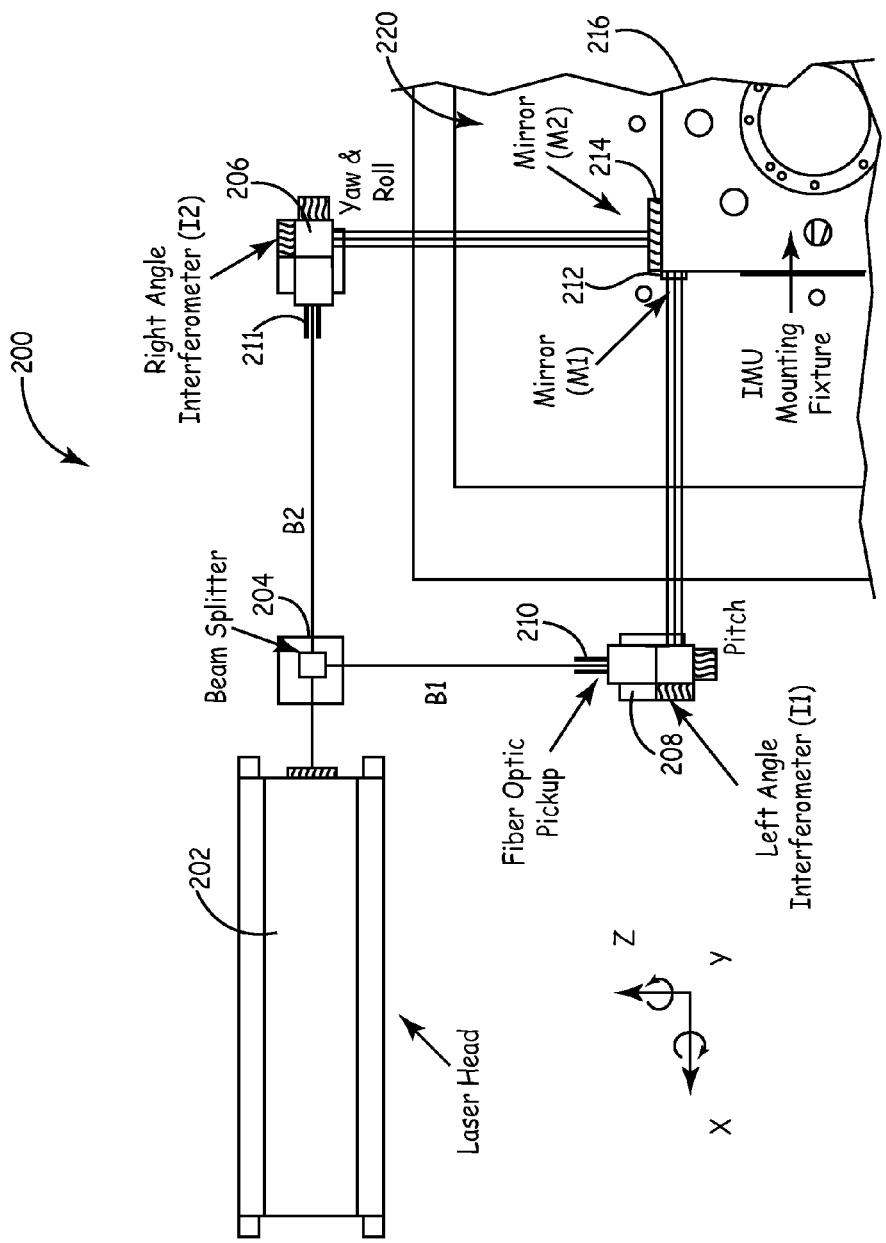
FIG. 2 is a side view of another embodiment of the present invention.

Referring to FIG. 2, another embodiment of an angular rotation noise measurement system 200 of the present invention is illustrated. In this embodiment, two interferometers 206 and 208 and two mirrors 212 and 214 are used. As illustrated, an original laser beam from laser 202 is split into two separate split beams B1 and B2 with beam splitter 204. The split beams B1 and B2 are received by their respective interferometer 208 and 206. In particular the split beams B1 and B2 are received by associated fiber optic pickups 210 and 211 of each respective interferometer 208 and 206. Each interferometer 208 and 206 then splits the split beams into secondary laser beams which are reflect back off of respective mirrors 212 and 214. The mirrors 212 and 214 are coupled to the fixture 216 of a shaker table 220. The embodiment of FIG. 2 allows for the determination of the angular rotations in two axis's simultaneously. In particular, in this embodiment, the yaw and roll angular rotation in the Z axis direction can be determine as well and the pitch angular rotation in the X axis direction. The laser 202, beam splitter 204, right angle interferometer 206 and the left angle interferometer 208 are all mounted to one or more stable bodies that is insolated from the motion of the shaker table. The angular rotation along the X and Z axis is determined by measuring a shift in the dark and light fringe pattern of an infringement pattern formed by the respective reflected back secondary laser beams.

Figure 3:
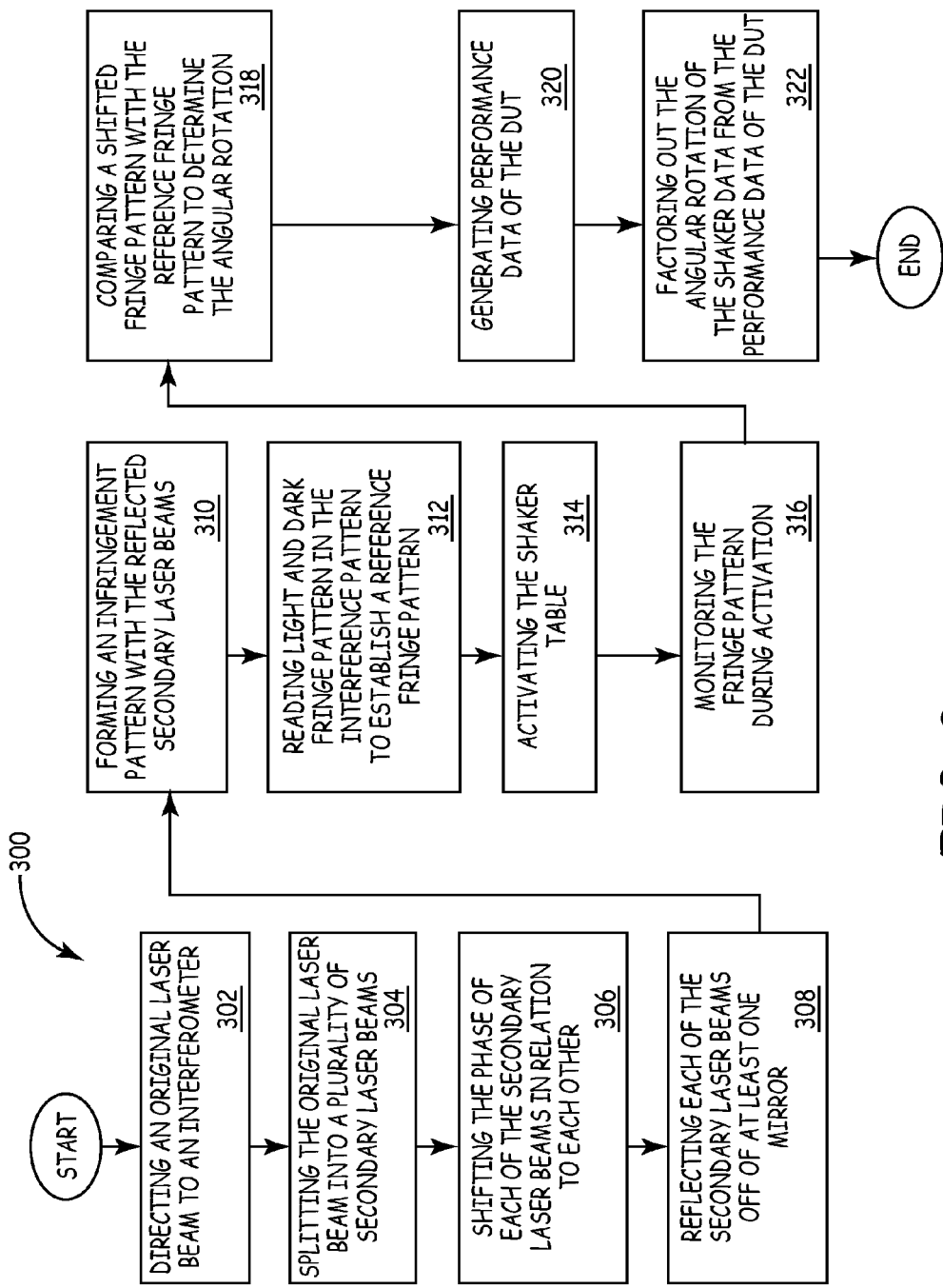
FIG. 3 is a flow diagram illustrating one method of implementing one embodiment of the present invention.

In FIG. 3 a flow diagram 300 illustrating one method of determining the angular rotation of a shaker table with the angular rotation noise measuring system of present invention is illustrated. The method starts by directing an original laser beam from a laser that is mounted on an insulated structure to an interferometer mounted that is also mounted on an insulated structure (302). In one embodiment, the laser and the interferometer are both coupled to the same insulated structure as illustrated in FIG. 1. An insulated structure is structure that is not affected by the movement of the shaker table. The original laser beam is then split into a plurality of secondary laser beams (304). In one embodiment, the original laser beam is split into three secondary laser beams. Each of the secondary laser beams are shifted out of phase with respect to each of the other secondary laser beams (306). Further, in one embodiment, an interferometer is used to split the beams and adjust their phase in relation to each other. Each of the secondary laser beams are then reflected off of an associated mirror (308). The placement of the mirror is normally orthogonal to its associated secondary beam such that the secondary beam is reflected back through the path it took to reach the mirror.

An interference pattern is then formed with the returned secondary beams (310). The light and dark fringe patterns in the interference patterns are measured to get a reference fringe pattern reading (312). The shaker table is then activated (314). Once the shaker table has been activated (314), the interferometer continues to monitor the fringe pattern (316). If there is rotation, the secondary beams will go through some shift in frequency which will shift the fringe pattern (i.e. a shifted fringe pattern). The angular rotation of the fixture of the shaker table is then determined by comparing the shifted fringe pattern with the reference fringe pattern (318). Performance data of a DUT mounted to the fixture is generated when the shaker table is activated (320). The angular rotation caused by the shaker table can then be factored out of the results of a DUT in regards to the angular rotation along the axis tested (322). The angular rotation of the fixture along other axis's can be determined in a similar manner.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of factoring out the angular rotation of a shaker table along an axis, the method comprising:
    determining the angular rotation of a fixture on a shaker table based at least in part on reflecting two or more laser beams with off set phases off of at least one mirror coupled to the fixture on the shaker table; and
    subtracting the determined angular rotation of the fixture out of test results of a device under test mounted to the fixture.

2. The method of claim 1, wherein determining the angular rotation of the fixture further comprises:
    creating a reference fringe pattern with the reflected two or more laser beams;
    activating the shaker table;
    monitoring the fringe pattern after activating the shaker table; and
    comparing the fringe pattern after activation with the reference fringe pattern.

3. The method of claim 2, wherein determining the angular rotation of the fixture further comprises:
    measuring a shift in the fringe pattern.

4. The method of claim 2, wherein determining the angular rotation of the fixture further comprises:
    measuring the intensity of the fringe patterns;
    determining the length of each laser beam base at least in part on the measuring of the intensity of the fringe patterns; and
    determining the rotation using trigonometry on the lengths of the laser beams.

5. The method of claim 2, further comprising:
    orthogonally aligning the two or more laser beams with the mirror such that the two or more laser beams are reflected back through the path they traveled in reaching the mirror.

6. A method of determining the angular rotation along an axis of motion of a fixture in a random vibration testing device, the method comprising:
    splitting a primary laser beam into two or more secondary laser beams;
    shifting the phase of at least one of the secondary laser beams such that at least one of the secondary laser beams is out of phase in relation to the remaining secondary laser beams;
    reflecting each secondary laser beam off of an associated mirror coupled to the fixture;
    reading a fringe pattern in a interference pattern created by the reflected secondary laser beams to get a reference fringe pattern;
    activating the random vibration testing device;
    reading a fringe pattern in a interference pattern created by the reflected secondary laser beams after the activation of the random vibration testing device to get a shifted fringe pattern; and
    comparing the shifted fringe pattern with the reference fringe pattern to determine the angular rotation along an axis of the fixture.

7. The method of claim 6, wherein splitting the primary laser beam further comprises:
    generating an primary laser beam;
    directing the primary laser beam to an interferometer; and
    splitting the primary laser beam with the interferometer.

8. The method of claim 6, wherein shifting the phase of the at least one of the secondary laser beams is done with the interferometer.

9. The method of claim 6, wherein reflecting each secondary laser beam off of an associated mirror further comprises:
    aligning each associated mirror to be normally orthogonal to the associated secondary beam such that the associated secondary beam is reflected back along the path it took to reach the mirror.

10. The method of claim 6, further comprising:
    passing the reflected secondary laser beams to a measurement board via fiber optic cables.

11. The method of claim 10, further comprising:
    measuring dark and light areas in the fringe patterns.

12. The method of claim 11, further comprising:
    calculating the length of the beams from the measured dark and light areas of the fringe pattern;
    processing the angular rotation of the fixture based on the length of the beams.

13. An angular rotation noise measuring system, the measuring system comprising:
    a least one stable body;
    a laser configured to generate a primary laser beam, the laser being mounted to the at least one stable body;

at least one interferometer configured to split the primary laser beam into two or more out of phase secondary laser beams, the interferometer being coupled to the at least one stable body;

at least one mirror coupled to a fixture of a vibration generating device, wherein the fixture is configured to hold a device under test, each mirror configured to reflect an associated secondary laser beam back to the interferometer such that an interference pattern is formed with the secondary laser beams;

a measuring board configured to measure the intensity of the light and dark fringes in the interference pattern; and a processor configured to determine the angular rotation based on changes in the interference pattern.

14. The measuring system of claim 13, wherein the at least one mirror has generally a flat surface.

15. The measuring system of claim 13, wherein the primary laser beam from the laser has a frequency generally in the range of 10 to 20 Kilohertz.

16. The measuring system of claim 13, wherein the stable body is insulated from the vibrations of the vibration generating device.

17. The measuring system of claim 13, wherein the at least one mirror further comprises:

a first mirror configured to be coupled to the fixture along a first axis; and a second mirror configured to be coupled to the fixture along a second axis.

18. The measuring system of claim 17, wherein the at least one interferometer further comprises:

a first interferometer configured to direct a first primary light beam to the first mirror; and a second interferometer configured to direct a second primary light beam to the second mirror.

19. The measuring system of claim 18, further comprising:

a beam splitter configured to split the primary laser beam into the first and second primary light beams.

20. The measuring system of claim 13, further comprising:

an interface card configured to interface data from the measuring board to a processor.

21. An angular rotation noise measuring system, the measuring system comprising:

a laser configured to generate a primary laser beam;

a beam splitter configured to split the primary laser beam into first and second split laser beams;

a first interferometer configured to split the first split laser beam into a plurality of out of phase secondary laser beams;

a second interferometer configured to split the second split laser beam into a plurality of out of phase secondary laser beams;

a first mirror coupled to a fixture of a vibration simulation system, the first mirror configured to reflect the secondary laser beams from the first interferometer back to the first interferometer along the same path the secondary laser beams took in reaching the first mirror;

a second mirror coupled to the fixture of the vibration simulation system, the second mirror configured to reflect the secondary laser beams from the second interferometer back to the second interferometer along the same path the secondary laser beams took in reaching the second mirror; and a processor configured to process data relating to fringe patterns in interference patterns created by the reflected secondary laser beams to determine the angular rotation noise produced by the vibration simulation system.

22. The measuring system of claim 21, further comprising:

one or more stable bodies that are isolated from the vibrations of the vibration simulation system, wherein the laser, beam splitter, and first and second interferometers are coupled to the one or more stable bodies.

* * * * *